United States Patent [19]

Sone et al.

[11] Patent Number: 5,786,964
[45] Date of Patent: Jul. 28, 1998

[54] MAGNETIC DISK DRIVE UNIT WITH IMPROVED SIGNAL FEEDING AND EXTRACTING ARRANGEMENT

[75] Inventors: Katsuhide Sone, Kawasaki; Yoshinori Kadowaki; Kaoru Abiko, both of Higashine, all of Japan

[73] Assignee: Fujitsu Limited, Kawasaki, Japan

[21] Appl. No.: 841,417

[22] Filed: Apr. 22, 1997

Related U.S. Application Data

[63] Continuation of Ser. No. 611,028, Mar. 5, 1996, abandoned, which is a continuation of Ser. No. 349,539, Dec. 5, 1994, abandoned.

[30] Foreign Application Priority Data

Mar. 8, 1994 [JP] Japan ................... 6-037174

[51] Int. Cl.$^6$ ................... G11B 5/55; G11B 5/48
[52] U.S. Cl. ................... 360/106; 360/104
[58] Field of Search ................... 360/106, 104, 360/105, 103

[56] References Cited

U.S. PATENT DOCUMENTS

| | | | |
|---|---|---|---|
| 4,630,158 | 12/1986 | Spark | 360/103 |
| 4,761,699 | 8/1988 | Ainslie et al. | 360/103 |
| 5,001,583 | 3/1991 | Matruzaki | 360/103 |
| 5,027,238 | 6/1991 | Konishi et al. | 360/104 |
| 5,198,945 | 3/1993 | Blaeser et al. | 360/104 |
| 5,659,448 | 8/1997 | Shimizu et al. | 360/104 |

FOREIGN PATENT DOCUMENTS

| | | |
|---|---|---|
| 265720A2 | 5/1988 | European Pat. Off. . |
| 484906A2 | 5/1992 | European Pat. Off. . |
| 540283A2 | 5/1993 | European Pat. Off. . |
| 53-30310 | 3/1978 | Japan . |
| 53-30311 | 3/1978 | Japan . |
| 56-83870 | 7/1981 | Japan . |
| 60-246015 | 12/1985 | Japan . |
| 61-160815 | 7/1986 | Japan . |
| 63-135514 | 9/1988 | Japan . |
| 6448756 | 3/1989 | Japan . |
| 4155675 | 5/1992 | Japan . |
| 546947 | 2/1993 | Japan . |
| 5159497 | 6/1993 | Japan . |
| 0757418 | 3/1995 | Japan . |
| 2233143 | 1/1991 | United Kingdom . |

OTHER PUBLICATIONS

Low Shear Force Flexure, IBM Technical Disclosure Bulletin, Feb. 1993, US, vol. 36, pp. 11–12.

*Primary Examiner*—Stuart S. Levy
*Assistant Examiner*—Allen Cao
*Attorney, Agent, or Firm*—Greer, Burns & Crain, Ltd.

[57] ABSTRACT

A magnetic disk drive unit includes a slider having a transducer mounted on one end thereof, and a spring arm for biasing the slider toward a magnetic disk. A flexure is integrally formed on a distal end portion of the spring arm, and the slider is attached to a slider placing-section of the flexure. A slit extending in a direction generally at a right angle to a longitudinal direction of the slider is formed in the slider placing-section, so that a shrinking force of an adhesive agent is cut off by this slit, thereby preventing deformation of the slider caused by the shrinking force of the adhesive agent. A flexible printed-wiring board is attached to a back surface of the spring arm, and terminals of the transducer are connected to a printed-wiring board of the magnetic disk drive unit through this flexible printed-wiring board.

11 Claims, 10 Drawing Sheets

MAGNETIC DISK DRIVE UNIT WITH IMPROVED SIGNAL FEEDING AND EXTRACTING ARRANGEMENT

This application is a continuation of application Ser. No. 08/611,028 abandoned filed on Mar. 5, 1996, which is a continuation of Ser. No. 08/349,539 abandoned filed on Dec. 5, 1994, now abandoned.

BACKGROUND OF THE INVENTION

1. Field of the Invention

The present invention relates generally to a magnetic disk drive unit, and more particularly to a magnetic disk drive unit in which an arrangement for feeding/extracting a signal to a transducer is improved.

2. Description of the Related Art

Recently, there is a demand that a magnetic disk drive unit, as one type of an external memory unit for a computer, is made smaller in size and larger in capacity. As one approach for making a magnetic disk drive unit larger in capacity, there is a method for increasing the number of magnetic disks mounted on a spindle. As the number of magnetic disks is increased, the mounting distance of magnetic disks is decreased in a recent magnetic disk drive unit.

In a magnetic disk drive unit for a computer, a floating magnetic head slider is used for avoiding a possible damage by contact with a magnetic disk medium. There is employed a system in which a balance between a floating force caused by an air stream generated by high-speed rotation (for example, 4,500 rpm) of the magnetic disk and a spring force for urging the slider against the disk causes the slider to float with a very small space (about 0.1 to 0.2 μm) and data is read from and written to the magnetic disk. In this system, the distance between the slider and the magnetic disk renders a significant effect to the performance for reading and writing data.

In the magnetic disk drive unit, in order to feed a write data signal to a transducer mounted on the slider or transmit a data signal read by the transducer to a printed-wiring board of the magnetic disk drive unit, the transducer and the printed-wiring board are connected through lead wires.

Figure 13A:
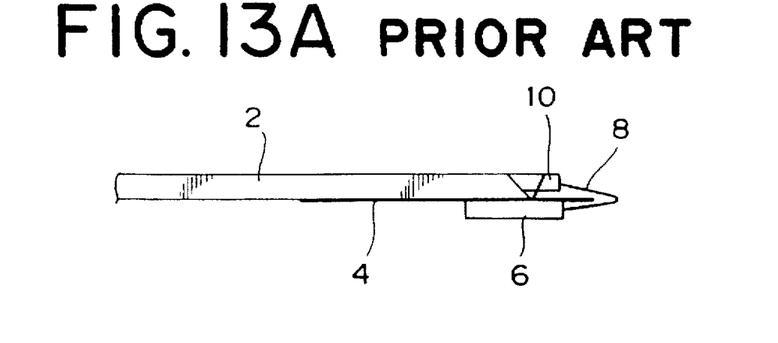
FIG. 13A is a side view of a prior art.
Figure 13B:
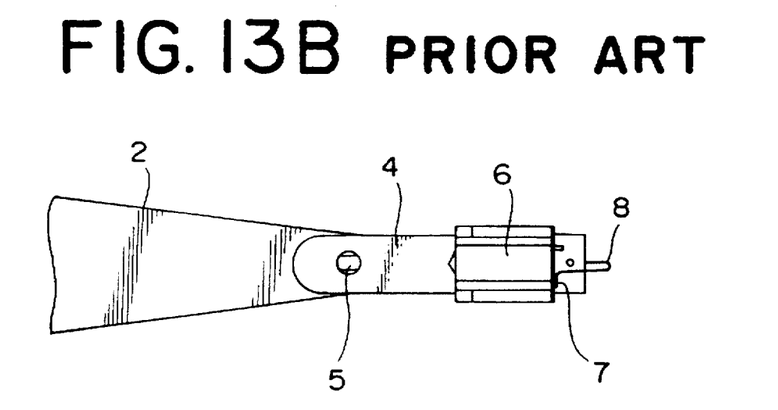
FIG. 13B is a bottom plan view of FIG. 13A.

Referring to FIG. 13, a conventional method for connecting the transducer and the printed-wiring board will be briefly described. A flexure 4 is secured to the spring arm 2 at a point 5 by caulking or the like. A slider 6 is attached to a distal end portion of the flexure 4 and a transducer 7 is provided on one end of the slider 6. One end of lead wires 8 are connected to terminals of the transducer 7, and the lead wires 8 are inserted into a tube 10 which is mounted along a side portion of the spring arm 2. The other end of the lead wires 8 are connected to a printed-wiring board of a magnetic disk drive unit not shown.

However, if the connection between the transducer 7 and printed-wiring board of the magnetic disk drive unit is accomplished through the lead wires as in the conventional unit mentioned above, there arises the following problems. That is, in order to prevent a cutting-off of the lead wires, it is necessary to increase the thickness of the lead wires 8 to some extent. To fulfill the requirement, the stable floating characteristic of the slider 6 is sacrificed by rigidity of the lead wires 8 and vibrations caused by the rigidity of the lead wires 8. As a result, a floating amount of the slider 6 is varied, the quality of a reproducing/recording signal with respect to the disk is decreased, and the reliability of the magnetic disk drive unit is lowered. Also, if the lead wires are used, the lead wires contact the disk due to vibration, etc., with the results that the lead wires are cut off and leak occurs allowing the flow of a large amount of electric current to thereby break the transducer.

Figure 14:
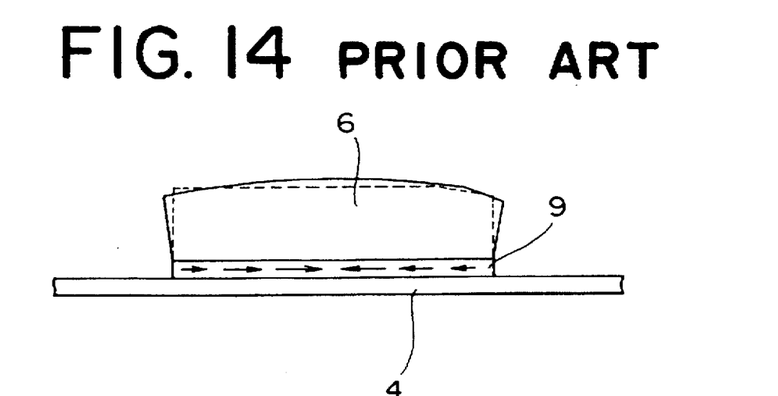
FIG. 14 is a view for explaining problems inherent in the prior art.

Also, since a back surface of the slider made of ceramic is heretofore fixedly attached to the flexure over its wide range of area, there arises a problem that when an adhesive agent is hardened, the slider is readily deformed due to a shrinkage force of the adhesive agent. Namely, as shown in FIG. 14, the slider 6 is secured to the flexure 4 by the adhesive agent 9. As the adhesive agent 9 is hardened, a shrinkage force thereof acts on the slider 6 in the sense of arrows and as a result, the slider 6 is deformed as shown by a solid line. When the slider 6 is deformed in this way, a floating gap between the transducer mounted on the slider 6 and the magnetic disk is varied, thus creating one of the causes for deteriorating the characteristics of the magnetic head.

For example, in a magnetic head assembly disclosed in Japanese Utility Model Laid-Open No. Sho 64-48756, since a slider is large in size and its area of contact with a flexure is smaller than the surface area of the slider, the problem of the slider being warped by adhesion is out of consideration. However, recently, since the slider becomes so small as about 1 to 2 mm in length, it is necessary to apply an adhesive agent generally over an overall surface of the back of the slider in order to obtain a certain degree of adhesive strength and as a result, the slider is warped by its stress. In case the slider is warped, even if a floating amount of the slider is constant, a gap between the disk and the transducer becomes larger than an actual floating amount to thereby deteriorate quality of the reproducing signal output and/or recording signal output.

SUMMARY OF THE INVENTION

It is, therefore, an object of the present invention to provide a magnetic disk drive unit, in which deformation of a slider caused by hardening of an adhesive agent is prevented, and a floating gap can be set smaller with high precision, thereby enabling to improve the quality of signal.

Another object of the present invention is to provide a magnetic disk drive unit, in which an arrangement for feeding/extracting a signal with respect to a transducer is improved to stabilize the floating characteristics of the slider, thereby improving the quality of signal.

In accordance with an aspect of the present invention, there is provided a magnetic disk drive unit comprising: a housing having a base and a cover; a magnetic disk rotatably mounted within the housing and having a plurality of tracks; a transducer for writing/reading data with respect to the magnetic disk; a slider having the transducer mounted on one end thereof; a spring arm having a flexure integrally formed on one end thereof and adapted to bias the slider in a direction of the magnetic disk, the flexure having a slider placing-section, with the slider attached to the slider placing-section, the slider placing-section of the flexure having at least one slit extending in a direction generally at a right angle to a longitudinal direction of said spring arm; and actuator means for moving the slider, which is placed on the spring arm, across the tracks of the magnetic disk.

The slider placing-section is defined by a plurality of slits which define bridges between the slits. The flexible printed-wiring board is attached to the surface of the spring arm opposite to the surface on which the slider is placed, so that the terminals of the flexible printed-wiring board are located in such a manner as to correspond to one of the slits. The terminals of the flexible printed-wiring board and the terminals of the transducer are connected to each other through electrically-conductive connecting materials such as gold balls.

Since the slit extending in a direction generally at a right angle to the longitudinal direction of the spring arm is formed in the slider placing-section of the flexure, the shrinking force generated during the hardening of the adhesive agent is cut off and the shrinking force of the adhesive agent can be absorbed by the slit. Since the slider placing-section is reduced in its rigidity due to the provision of the slit even if the adhesive agent is shrunk, it is susceptible to deformation and the internal stress of the adhesive agent can be lowered. As a result, deformation of the slider caused by the shrinking force of the adhesive agent can be effectively prevented.

Furthermore, since the connection between the transducer and the printed-wiring board on the side of the magnetic disk drive unit is achieved through the flexible printed-wiring board having no bend portion (or angle portion), a stable floating characteristic of the slider can be obtained without being adversely affected by the flexible printed-wiring board.

The above and other objects, features and advantages of the present invention and the manner of realizing them will become more apparent, and the invention itself will/best be understood from a study of the following description and appended claims with reference to the attached drawings showing some preferred embodiments of the invention.

DESCRIPTION OF THE PREFERRED EMBODIMENTS

Figure 1:
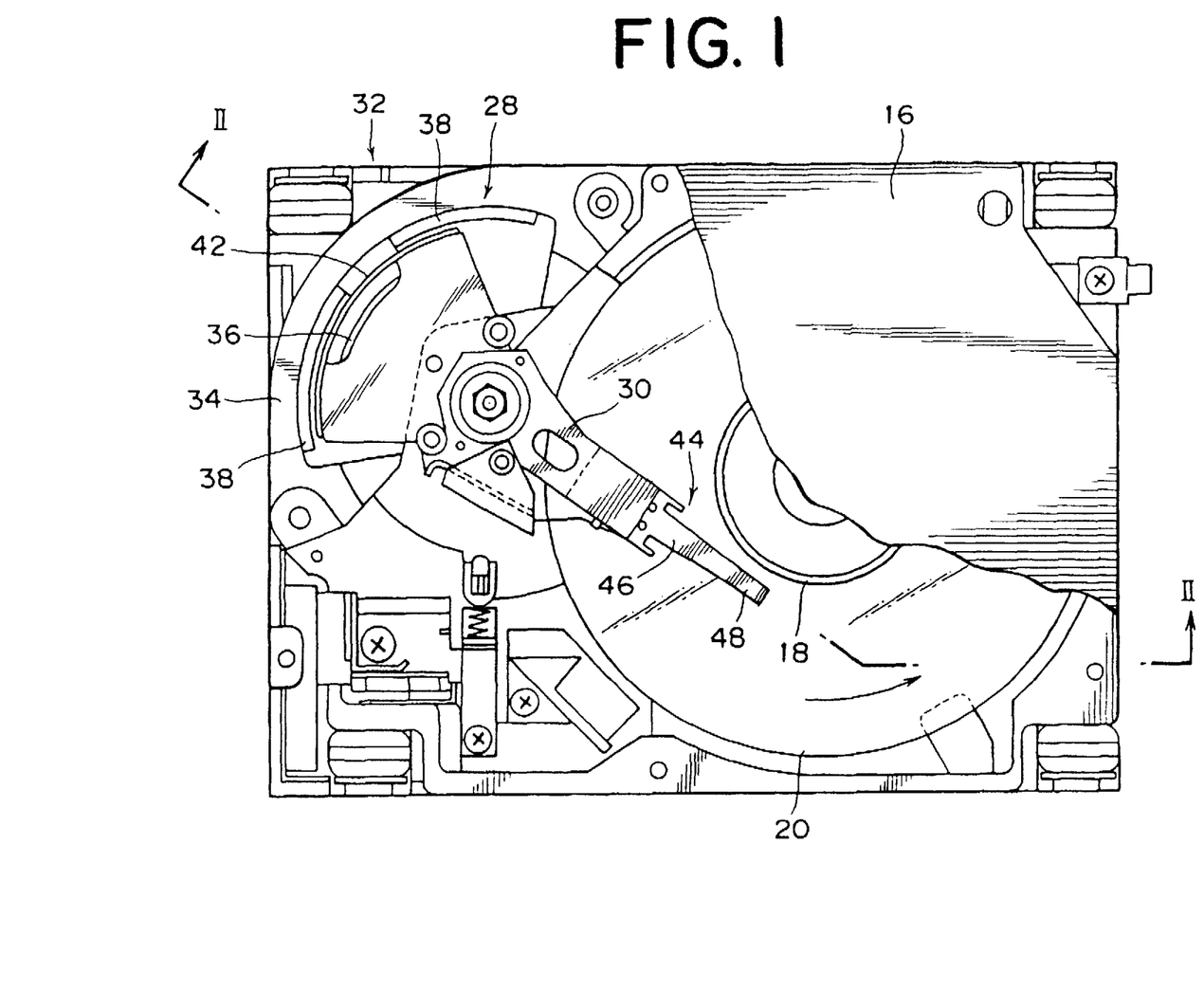
FIG. 1 is a partly exploded plan view of a magnetic disk drive unit incorporating the present invention.
Figure 2:
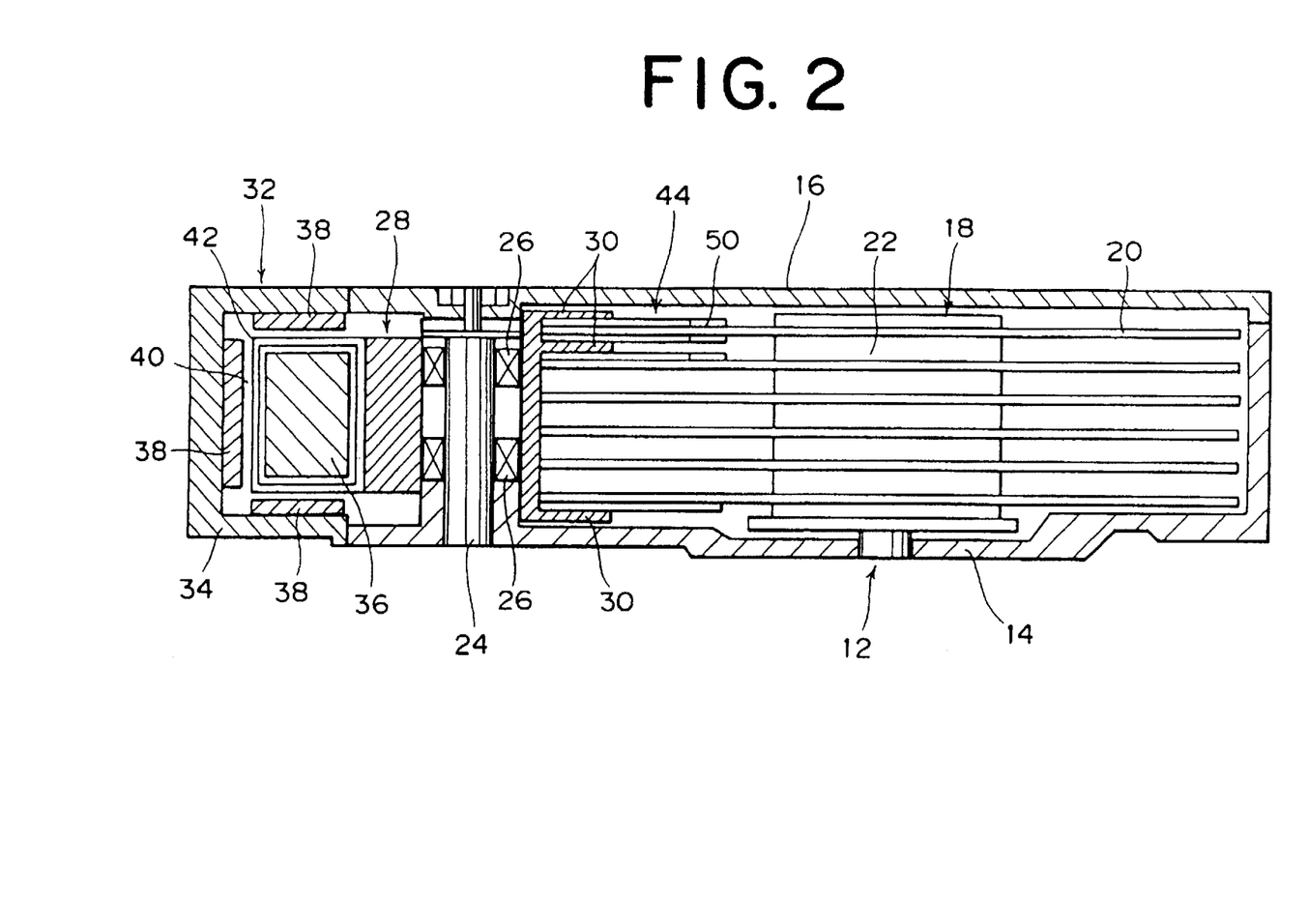
FIG. 2 is a cross-sectional view taken on line II—II of FIG. 1.

Referring first to FIGS. 1 and 2, reference numeral 12 denotes a housing (enclosure) which comprises a base 14 and a cover 16. On the base 14, a spindle hub 18, which is rotated by an inner hub motor not shown, is provided. Magnetic disks 20 and spacers 22 are alternately inserted in the spindle hub 18, so that the magnetic disks 20 are mounted on the spindle hub 18 with a predetermined space formed therebetween. By tightly connecting a disk clamp not shown to the spindle hub 18, each magnetic disk 20 is clamped between adjacent spacers 22 and 22 and secured relative to the spindle hub 18.

A shaft 24 is secured to the base 14, and an actuator assembly 28 is rotatably mounted around the shaft 24 through bearings 26. The actuator assembly 28 includes actuator arms 30 capable of rotating in a direction crossing the tracks of the magnetic disks 20 and extending in a recording surface direction of each magnetic disk 20. A magnetic circuit 32 is provided on a corner portion of the housing 12. The magnetic circuit 32 comprises an outer yoke 34, an inner yoke 36 integral with the outer yoke 34, and a plurality of permanent magnets 38 provided on an opposing surface of the outer yoke 34 to the inner yoke 36. Between the outer yoke 34 and the inner yoke 36, a magnetic gap 40 is defined.

The actuator assembly 28 includes a coil 24 mounted on an opposite side to the actuator arms 30 with respect to the shaft 24. This coil 42 is inserted in the magnetic gap 44. A head suspension mechanism 40 is secured to distal ends of the actuator arms 30. The head suspension mechanism 44 comprises a spring arm 46 having a flexure 48 integrally mounted on a distal end of the spring arm 46. A slider 50 having a transducer mounted thereon for writing/reading data with respect to the recording surface of each magnetic disk 20 is secured to the flexure 48.

Figure 3:
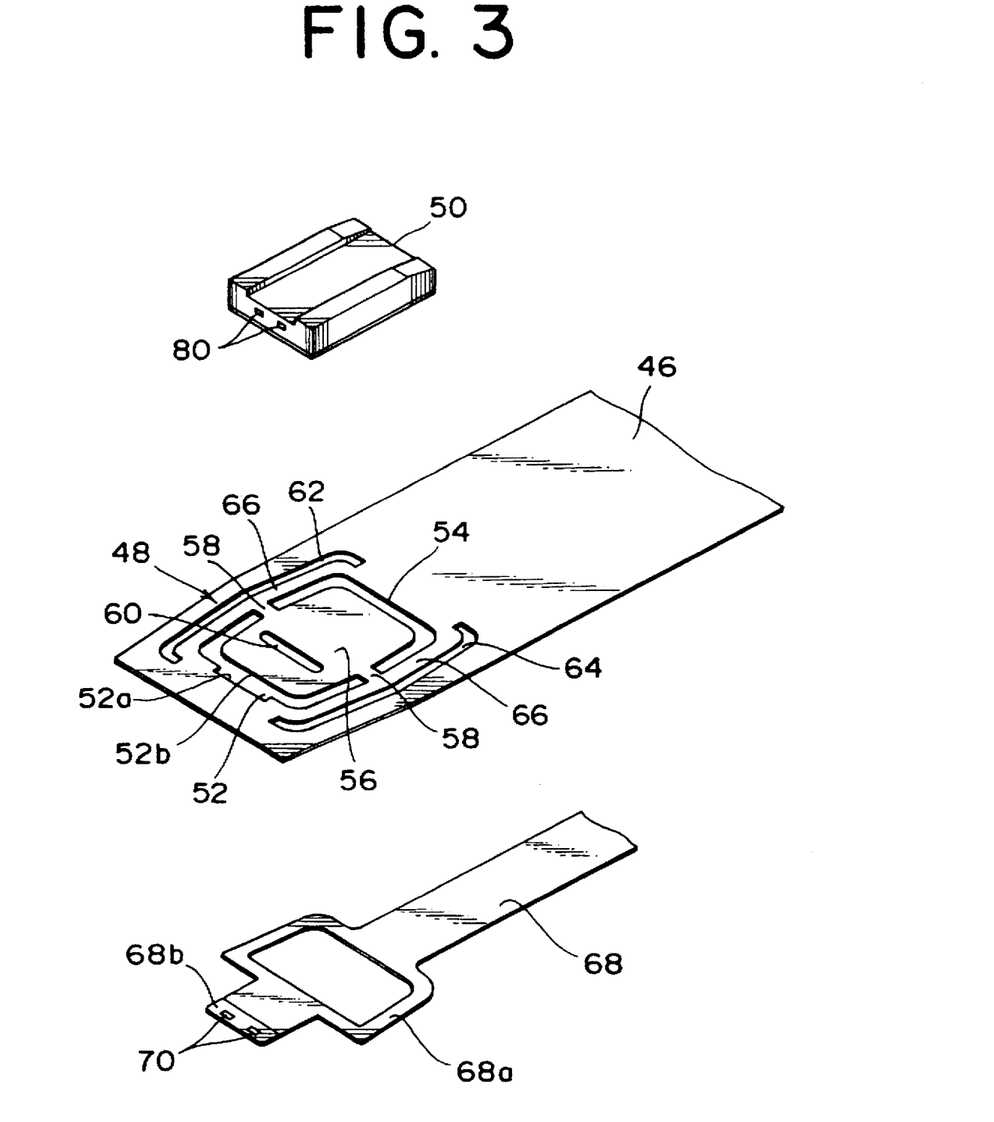
FIG. 3 is an exploded perspective view showing important portions of a first embodiment of the present invention.

Next, a characteristic portion of a first embodiment of the present invention will be described with reference to FIGS. 3 to 7. Referring first to FIG. 3, the flexure 48, which is defined by a plurality of slits is integrally formed on a distal end portion of the spring arm 46. The flexure 48 includes a slider placing-section 56 defined by a pair of C-shaped slits 52 and 54. The slider placing-section 56 has a slit 60 extending in a direction generally at a right angle to a longitudinal direction of the slider 50 or spring arm 46. And the slider 50 is secured to this slider placing-section 56 by adhesive.

Between the pair of C-shaped slits 52 and 54, a pair of bridges 58 are defined. The C-shaped slit 52 is increased in width because of a provision of a cut-out wall portion 52a, and an insulating film is formed on an opposing wall portion 52b to the wall portion 52a. The insulating film may be formed on an overall surface of the slider placing-section 56. The flexure 48 further includes a pair of slits 62 and 64 which are formed in area outside the C-shaped slits 52 and 54. Flexure frames 66 are each defined between the C-shaped slits 52, 54 and the slit 62 and between the C-shaped slits 52, 54 and the slit 64.

Reference numeral 68 denotes a flexible printed-wiring board. This flexible printed-wiring board 68 is attached to a back surface of the spring arm 46. The configuration of the portion of the flexible printed-wiring board 68 corresponding to the flexure 48 resembles to that of the flexure 66 as shown by broken lines of FIG. 4. Owing to this arrangement, the flexible printed-wiring board 68 can be obedient to deformation of the flexure 48, so that the degree of freedom of the flexure 48 is not lost. A pair of terminals 70 are formed on a distal end portion 68b of the flexible printed-wiring board 68. The flexible printed-wiring board 68 is attached to the spring arm 46 such that the terminals 70 are located within the C-shaped slit 52.

Figure 4:
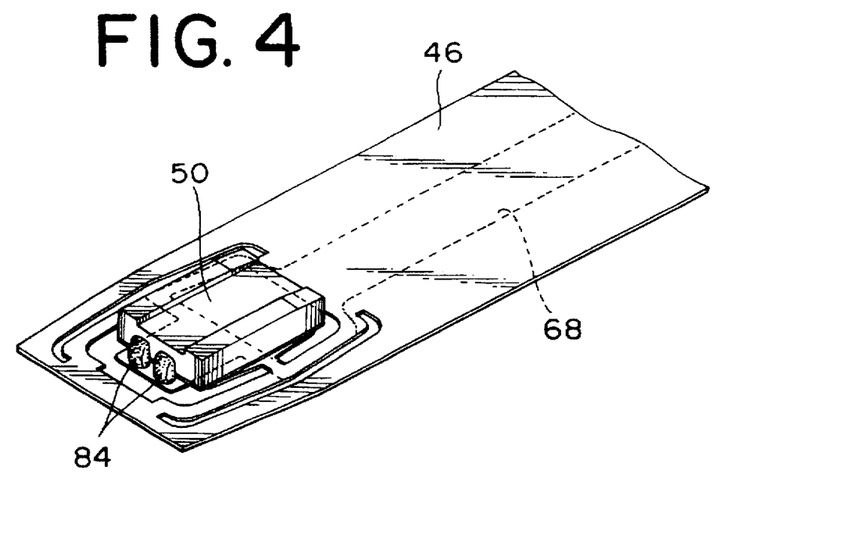
FIG. 4 is a perspective view showing the important portions of the first embodiment.

As shown in FIG. 4, terminals 80 of the transducer mounted on the slider 50 and the terminals 70 of the flexible printed-wiring board 68 are bonded together through gold balls 84. The connecting means is not necessarily limited to the gold ball but a copper ball may be used. In other words, any suitable material may be used as long as they have electrically conductive and soft (elastic) properties. Accordingly, if the connection is made by means of the ball bonding, the floating amount can be set low without taking into consideration the vibration of the lead wires. The other end of the flexible printed-wiring board 68 is connected to a printed-wiring board of a magnetic disk drive unit not shown.

Figure 5:
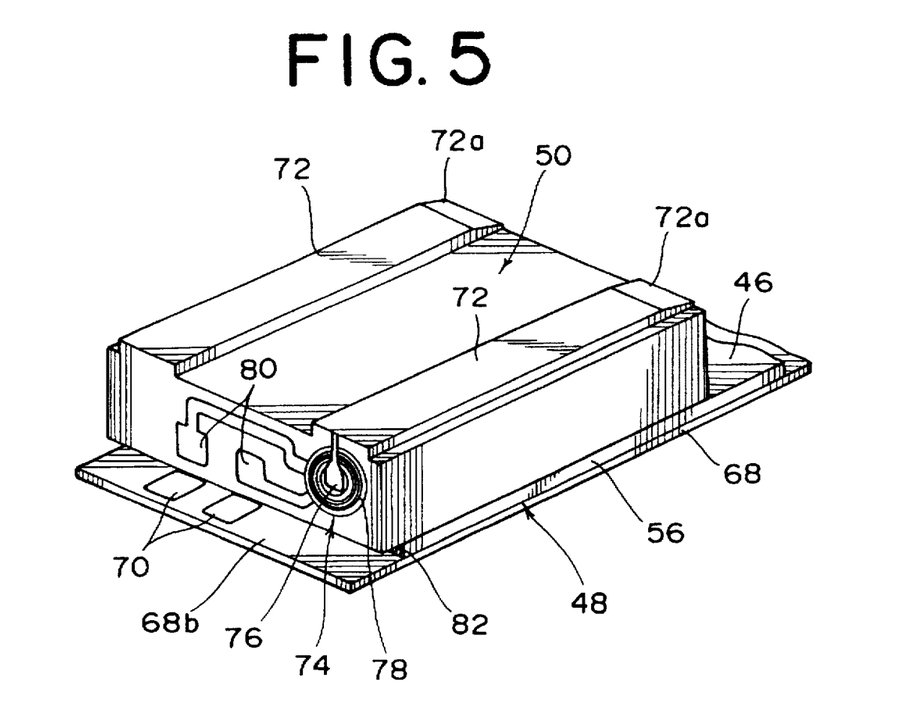
FIG. 5 is an enlarged perspective view showing the important portions of the first embodiment.
Figure 6:
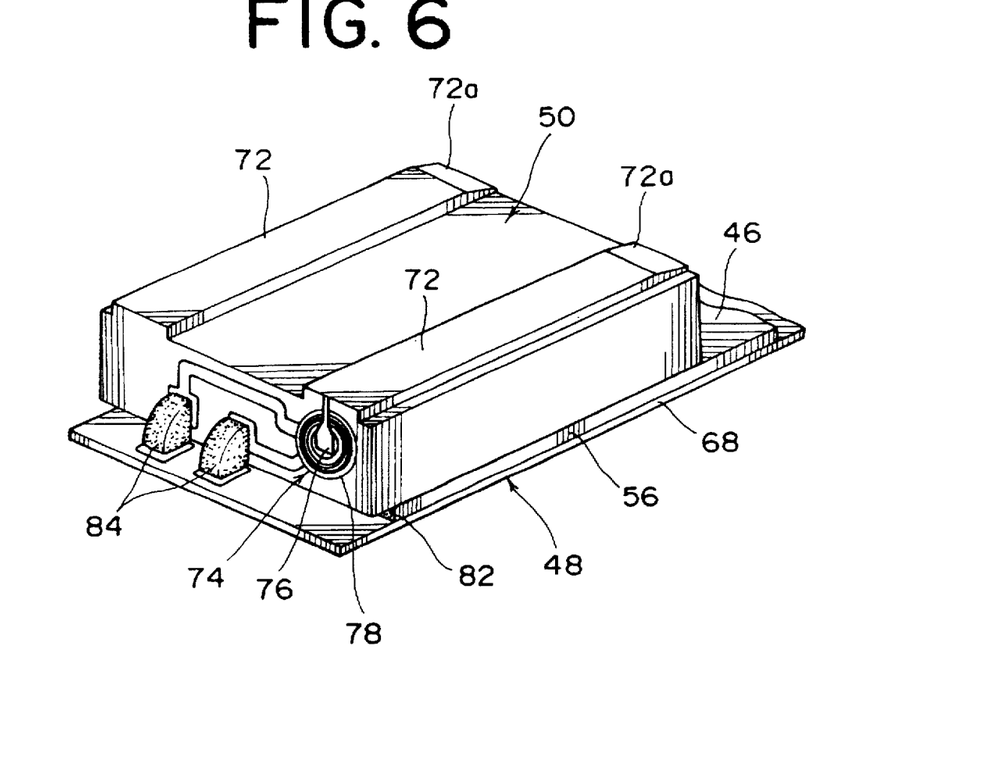
FIG. 6 is an enlarged perspective view showing the important portions of the first embodiment but after the completion of gold ball bonding.

Referring to FIGS. 5 and 6, a construction of the slider placing-section will be described. A pair of rails 72 projecting in a magnetic disk direction are formed on two sides of an opposing surface of the slider 50 to the magnetic disk. A taper 72a served to facilitate a floating of the slider 50 is formed on an entrance end of each rail 72.

On an exit end of the slider 50, a transducer 74 such as a thin-film magnetic head is provided. The transducer 74 includes a magnetic pole 76, a coil 78 wound about the magnetic pole 76, and a pair of terminals 80. As shown in FIG. 5, the flexible printed-wiring board 68 is attached to the back surface of the spring arm 46 such that the distal end 68b of the flexible printed-wiring board 68 is allowed to project slightly from the slider 50 and the terminals 70 of the flexible printed-wiring board 68 are placed opposite to the terminals 80 of the transducer 74.

As shown in FIG. 6, the terminals 70 of the flexible printed-wiring board 68 and the terminals 80 of the transducer 74 are bonded together through electrically conductive connecting materials such as the gold balls 84, respectively. In order to prevent a formation of a short circuit due to the gold balls 84 contacting the spring arm 46, an insulating coating 82 is formed on the wall portion 52b of the slider placing-section 56 which defines the slit 52 as mentioned above. In this way, since the connection between the terminals 80 of the transducer 74 and the printed-wiring board of the magnetic disk drive unit is made using the flexible printed-wiring board 68 which has no bending portion, the flexible printed-wiring board 68 is deformed in accordance with deformation of the flexure 48 on which the slider 50 is mounted. Accordingly, a stable floating characteristic of the slider can be obtained without being adversely affected by rigidity of the lead wires as experienced conventionally.

Figure 7:
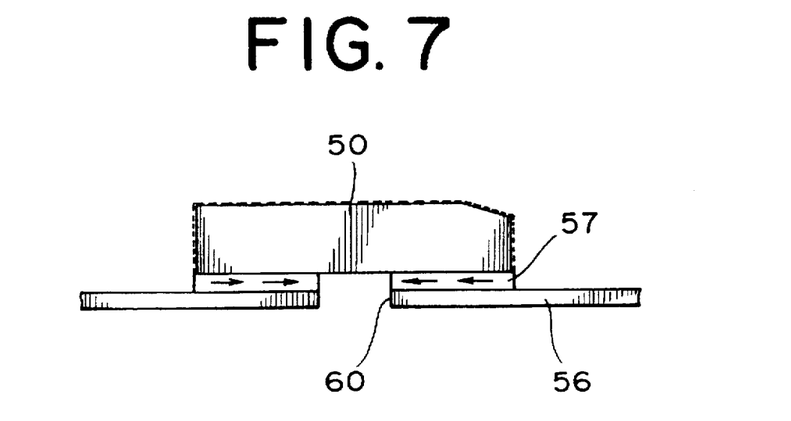
FIG. 7 is a view for explaining the affection caused by hardening shrinkage of an adhesive agent to a slider.

Also, the slit 60 extending in a direction at a right angle to the longitudinal direction of the slider 50 is formed in the slider placing-section 56 of the flexure 48 as mentioned above. Owing to this arrangement, as shown in FIG. 7, the shrinking force generated during the hardening of the adhesive agent 57 in the directions as shown by the arrows is cut off by the slit 60, so that the slider 50 can be restrained from being deformed like a crown as shown in FIG. 14. According to the method of attachment of this embodiment, the slider 50 is hardly deformed even after hardening of the adhesive agent 57 as shown by a solid line. The slit is most preferred to extend in the direction capable of preventing a warping of the slider, namely, perpendicular direction to a warping direction of the slider where a warping amount of the slider is large. If only relaxing of the stress is taken into consideration, the slit may extend in any directions.

Figure 8:
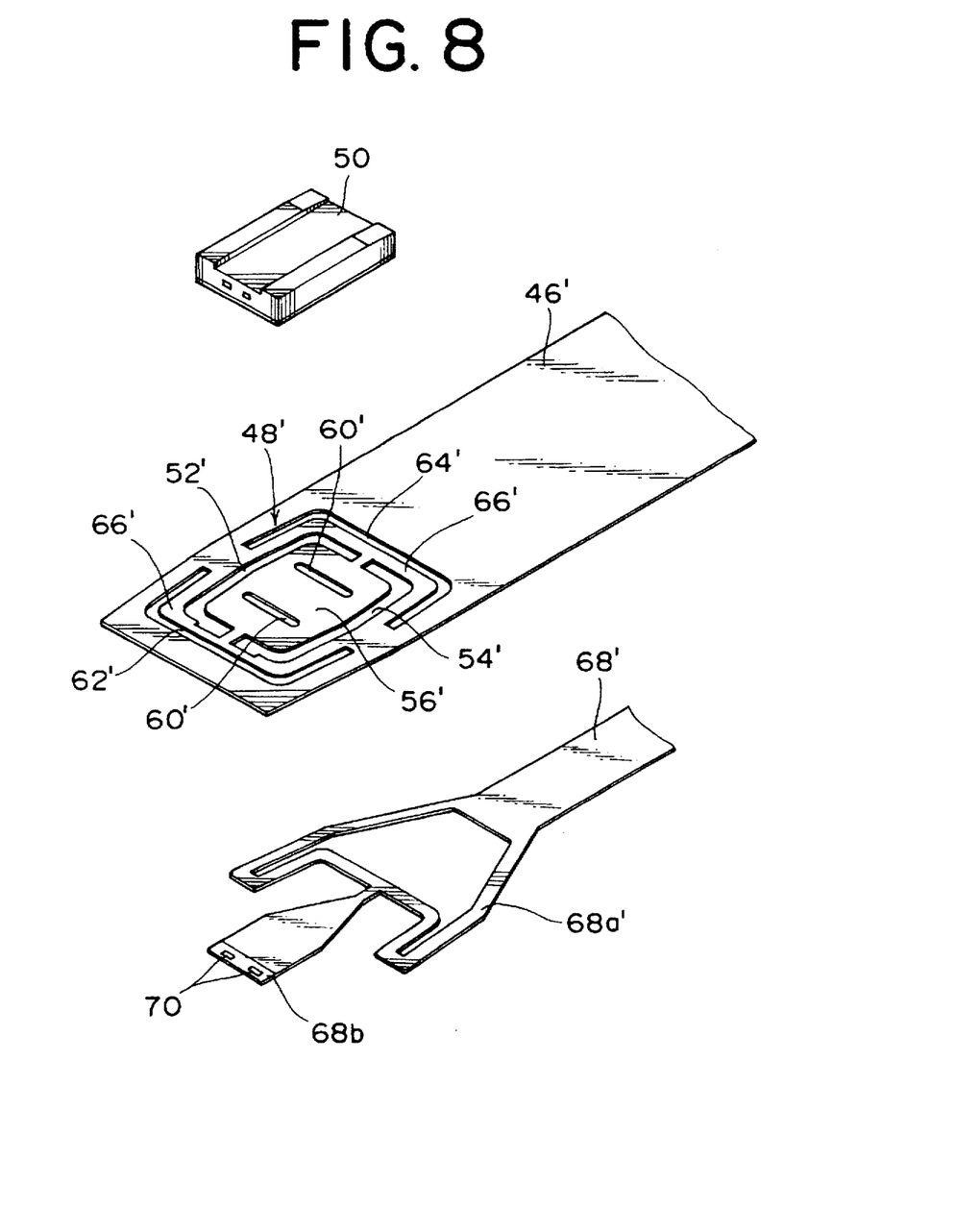
FIG. 8 is an exploded perspective view showing important portions of a second embodiment of the present invention.
Figure 9:
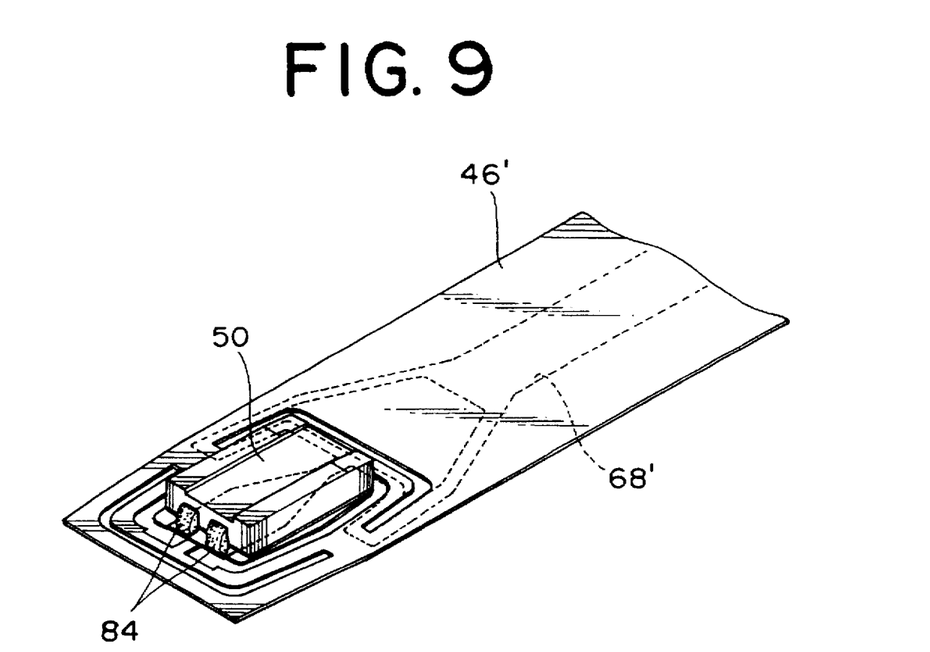
FIG. 9 is a perspective view showing the important portions of the second embodiment.

Referring now to FIGS. 8 and 9, a characteristic portion of a second embodiment of the present invention will be described. A flexure 48', which is defined by a plurality of slits, is integrally formed on a distal end portion of a spring arm 47'. A slider placing-section 56' is defined by a pair of C-shaped slits 52' and 54'. The slider placing-section 56' has a pair of slits 60' extending in a direction generally at a right angle to a longitudinal direction of the slider 50. The slider 50 is attached onto the slider placing-section 56' of the flexure 48'.

The flexure 48' further has a pair of C-shaped slits 62' and 64' which are formed in area outside the C-shaped slits 52' and 54'. Flexure frames 66' are formed each between the inner C-shaped slits 52', 54' and the outer C-shaped 62' and between the inner C-shaped slits 52', 54' and the outer C-shaped slit 64'. A flexible printed-wiring board 68' is attached to a back surface of the spring arm 46' as in the first embodiment. The portion 68a' of the flexible printed-wiring board 68' corresponding to the flexure 48' has a configuration similar to that of the flexure frame 66' as shown by broken lines of FIG. 9. A pair of terminals 70 are formed in the distal end portion 68b of the flexible printed-wiring board 68'.

As in the first embodiment mentioned above, the flexible printed-wiring board 68' is attached to the back surface of the spring arm 46' such that the terminals 70 are located within the inner C-shaped slits 52' and 54'. As shown in FIG. 9, the terminals of the transducer and the terminals 70 of the flexible printed-wiring board 68' are bonded together through gold balls 84. Similar effects as in the first embodiment can also be obtained in this second embodiment.

Figure 10A:
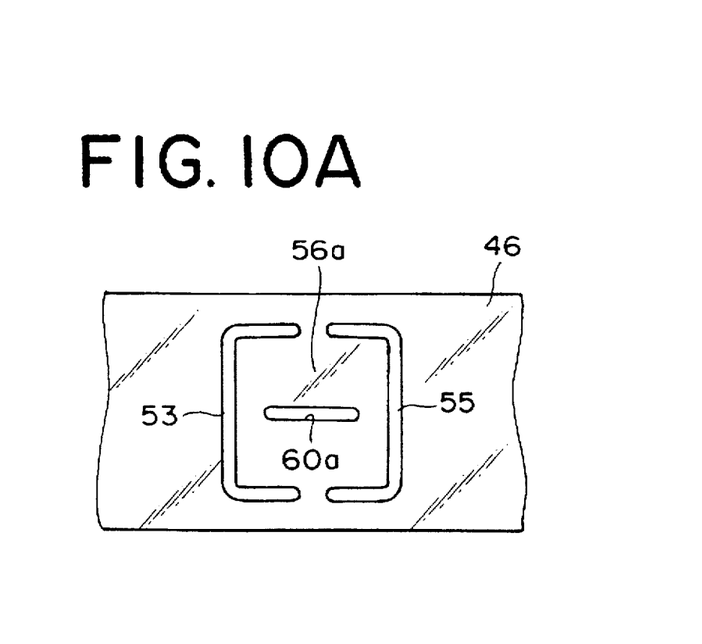
FIG. 10A and FIG. 10B are schematic views showing another embodiments of the slider placing-section.
Figure 10B:
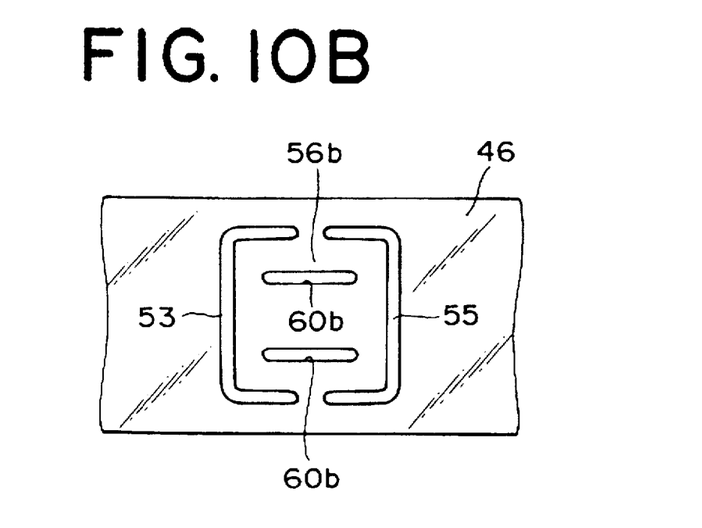

FIGS. 10A and 10B show other embodiments of the slider placing-section. These embodiments are effective to a case where a slider is long in a lateral direction, i.e., a slider is long in a direction parallel to an end face on which a transducer is mounted. In the embodiment of FIG. 10A, a slider placing-section 56a is defined by a pair of C-shaped slits 53 and 55, and a slit 60a extending in a direction generally at a right angle to a longitudinal direction of the slider is formed in a generally central area of a portion where the slider is attached.

In the embodiment of FIG. 10B, a pair of slits 60b are formed in a slider placing-section 56b which are defined by the C-shaped slits 53 and 55. By forming such slits 60a and 60b in the slider placing-sections 56a and 56b, a shrinking force generated during the hardening of adhesive agent can be cut off by the slit 60a or slits 60b and therefore, deformation of the slider caused by the hardening of adhesive agent can be restrained.

In the above-mentioned respective embodiments, since the slider is attached to the slider placing-section by an adhesive agent applied to an overall back surface of the slider, slits are formed in a direction generally at a right angle to the longitudinal direction of the slider in order to reduce rigidity of the slider placing-section in a direction where a warping amount is large, thereby cutting off the stress.

Figure 11:
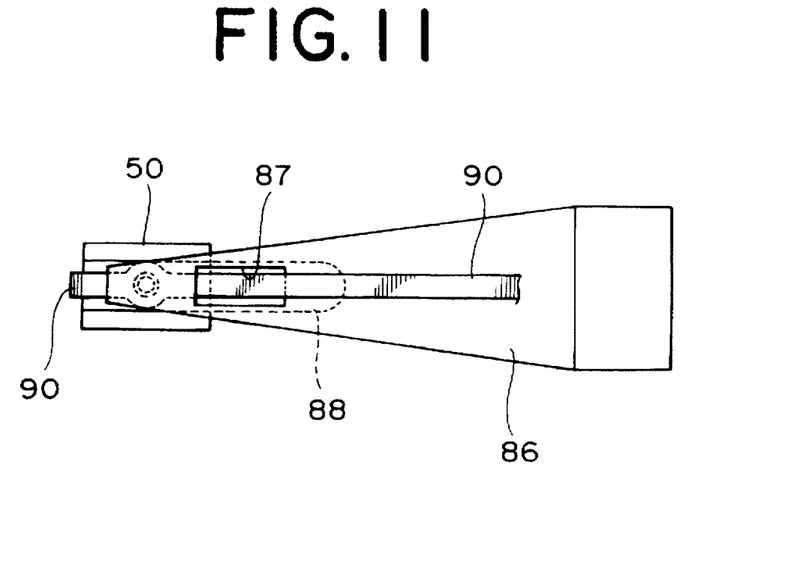
FIG. 11 is a plan view showing important portions of a third embodiment of the present invention.
Figure 12:
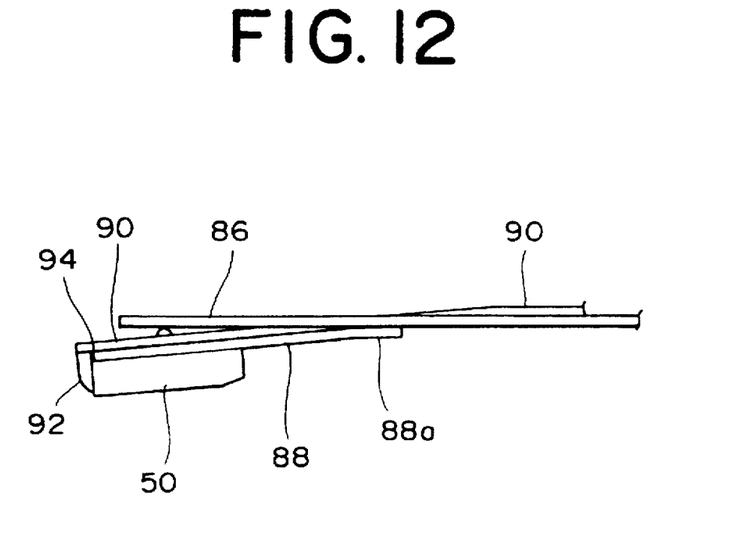
FIG. 12 is a side view showing the important portions of the third embodiment.

Next, referring to FIGS. 11 and 12, a characteristic portion of a third embodiment of the present invention will be described. This embodiment is of the type in which a spring arm is separated from a flexure. A basal end portion 88a of a flexure 88 is secured to the spring arm 86, and the slider 50 is attached to a distal end portion of the flexure 88. In a slider-placing section of the flexure 88 where the slider 50 is attached, at least one slit extending in a direction generally at a right angle to the longitudinal direction of the slider as shown in FIGS. 3 and 8 is formed. An opening 87 is formed in the spring arm 86. A flexible printed-wiring board 90 is inserted into the spring arm 86 from a top surface side to a back surface side thereof through this opening 87.

The flexible printed-wiring board 90 is attached to the spring arm 86 and the flexure 88 such that a distal end portion of the flexible printed-wiring board 90 having terminals is allowed to project slightly from the slider 50. The terminals of the transducer mounted on the slider 50 are connected to the terminals of the flexible printed-wiring board 90 through electrically conductive materials 92 such as gold balls. An insulating film 94 adapted to prevent formation of a short circuit between the electrically conductive materials 92 and the flexure 88 is formed on a distal edge of the flexure 88. The other end of the flexible printed-wiring board 90 is connected to a printed-wiring board of a magnetic disk drive unit not shown. This embodiment may also be applied to an integral type spring arm having an opening.

As in the above-mentioned first and second embodiments, since the flexible printed-wiring board 90 having no bending portion is used for connecting the terminals of the transducer to the printed-wiring board of the magnetic disk drive unit in this embodiment, floating characteristic of the slider can be prevented from being deteriorated. Furthermore, since at least one slit extending in a direction generally at a right angle to the longitudinal direction of the slider is formed in the slider placing-section, deformation of the slider caused by the hardening of adhesive agent can be prevented.

According to the present invention, since a shrinking force generated during the hardening of adhesive agent can be cut off by a slit or slits, deformation of the slider caused by the hardening of adhesive agent can be effectively prevented. With this feature, the floating gap of the slider can be set small and with high precision. As a result, there can be exhibited such an effect that a reproducing signal output and a recording signal output are improved. Also, since a signal is fed to a transducer and extracted from the transducer using a flexible printed-wiring board, stableness of the floating of a slider can be improved.

What is claimed is:

1. A magnetic disk drive unit comprising:
a housing having a base and a cover;
a magnetic disk rotatably mounted within said housing and having a plurality of tracks;
a transducer for writing/reading data with respect to said magnetic disk;
a slider having said transducer mounted on one end thereof;
a spring arm having a flexure integrally formed on one end of said spring arm and adapted to bias said slider toward said magnetic disk, said flexure having a slider placing-section, said slider being bonded to said slider placing-section by an adhesive, said slider placing-section being defined by a plurality of slits with a bridge left between said slits, said slider placing-section having at least one slit extending in a direction generally at a right angle to a longitudinal direction of said spring arm and said at least one slit having a first edge opposite a second edge, without separate and independent slits extending in a direction generally parallel with said longitudinal direction of said spring arm, wherein said slider is bonded adjacent to said first edge and said second edge of said at least one slit to mitigate deformation that occurs when said adhesive is hardened by cutting off shrinking force at said first and second edges, said shrinking force being generated during the hardening of the adhesive; and
actuator means for moving said slider mounted on said spring arm across the tracks of said magnetic disk.

2. A magnetic disk drive unit comprising:
a housing having a base and a cover;
a magnetic disk rotatably mounted within said housing and having a plurality of tracks;
a transducer for writing/reading data with respect to said magnetic disk;
a slider having said transducer mounted on one end thereof;
a spring arm having a flexure integrally formed on one end of said spring arm, and adapted to bias said slider toward said magnetic disk, said flexure having a slider placing-section, said slider being bonded to said slider placing-section by an adhesive, said slider placing-section being defined by a plurality of slits with a bridge left between said slits, said slider placing-section having at least one slit extending in a direction generally parallel with a longitudinal direction of said spring arm and said at least one slit having a first edge opposite a second edge, without separate and independent slits extending in a direction generally at a right angle with said longitudinal direction of said spring arm, wherein said slider is bonded adjacent to said first edge and said second edge of said at least one slit to mitigate deformation that occurs when said adhesive is hardened by cutting off shrinking force at said first and second edges, said shrinking force generated during the hardening of the adhesive; and
actuator means for moving said slider mounted on said spring arm across the tracks of said magnetic disk.

3. A magnetic disk drive unit comprising:
a housing having a base and a cover;
a magnetic disk rotatably mounted within said housing and having a plurality of tracks;
a transducer for writing/reading data with respect to said magnetic disk;
a slider having said transducer mounted on one end thereof;
a spring arm having a flexure integrally formed on one end of said spring arm, and adapted to bias said slider toward said magnetic disk, said flexure having a slider placing-section with said slider bonded to said slider placing-section by an adhesive, said slider placing-section being defined by a plurality of slits with a bridge left between said slits, said slider placing-section having at least one slit extending in a direction generally at a right angle to a longitudinal direction of said spring arm and said at least one slit having a first edge opposite a second edge, without separate and independent slits extending in a direction generally parallel with said longitudinal direction of said spring arm, wherein said slider is bonded adjacent to said first edge and said second edge of said at least one slit to mitigate deformation that occurs when said adhesive is hardened by cutting off shrinking force at said first and second edges, said shrinking force generated during the hardening of the adhesive;
actuator means for moving said slider mounted on said spring arm across the tracks of said magnetic disk;
a flexible printed-wiring board attached to an opposite surface of said spring arm with respect to a surface of said spring arm on which said slider is placed, so that terminals of said flexible printed-wiring board are located in such a manner as to correspond to one of said slits, said flexible printed-wiring board having, at a portion corresponding to said slider placing-section, a configuration resembling at least a part of said slider placing-section; and an electrically-conductive connecting-material for connecting said terminals of said flexible printed-wiring board to terminals of said transducer.

4. A magnetic disk drive unit as defined in claim 3, wherein said slider placing-section has at least one slit extending in a direction generally at a right angle to a longitudinal direction of said spring arm.

5. A magnetic disk drive unit as defined in claim 3, wherein a slit side surface on said slider placing-section side opposite to said electrically-conductive connecting-material is insulated.

6. A magnetic disk drive unit as defined in claim 5, wherein said electrically-conductive connecting-material has a ball-like configuration.

7. A magnetic disk drive unit as defined in claim 3, wherein said flexible printed-wiring board has a configuration similar to that of said flexure in the vicinity of said flexure.

8. A magnetic disk drive unit comprising:

a housing having a base and a cover;

a magnetic disk rotatably mounted within said housing and having a plurality of tracks;

a transducer for writing/reading data with respect to said magnetic disk;

a slider having said transducer mounted on one end thereof;

a flexure having a slider placing-section on one end of said flexure where said slider is bonded by an adhesive;

a spring arm for supporting said flexure which is secured to said flexure at the other end thereof and biasing said slider toward said magnetic disk, said slider placing-section being defined by a plurality of slits with a bridge left between said slits, said slider placing-section of said flexure having at least one slit extending in a direction generally at a right angle to a longitudinal direction of said spring arm and said at least one slit having a first edge opposite a second edge, without separate and distinct slits extending in a direction generally parallel with said longitudinal direction of said spring arm, said at least one slit located substantially within said slider placing-section of said flexure and mitigating deformation of said slider occurring when said adhesive is hardened by cutting off shrinking force generated at said first edge and said second edge during the hardening of the adhesive; and actuator means for moving said slider mounted on said flexure across the tracks of said magnetic disk.

9. A magnetic disk drive unit as defined in claim 8, wherein said spring arm has an opening formed in the vicinity of an area where said flexure is secured; and which further comprises a flexible printed-wiring board attached to one surface of said spring arm and an opposite surface of said flexure relative to a surface of said flexure where said slider is placed, such that said flexible printed-wiring board is inserted through said opening of said spring arm, with a distal end of said board allowed to project from one end of said flexure;

and an electrically-conductive connecting-material for connecting terminals of said flexible printed-wiring board to terminals of said transducer.

10. A magnetic disk drive unit as defined in claim 9, wherein one end face of said flexure has an insulating film.

11. A magnetic disk drive unit as defined in claim 10, wherein said electrically-conductive connecting-material has a ball-like configuration.

* * * * *